US008847129B2

(12) United States Patent
Kim et al.

(10) Patent No.: US 8,847,129 B2
(45) Date of Patent: Sep. 30, 2014

(54) CONVECTION HEATING UNIT AND HEATING COOKER HAVING THE SAME

(75) Inventors: Kwang Keun Kim, Suwon-si (KR); Keun Seuk Oh, Suwon-si (KR); Sang Jun Park, Hwasung-si (KR); In Ki Jeon, Suwon-si (KR); Jong Hoon Lee, Seoul (KR); Seung Joon Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 668 days.

(21) Appl. No.: 12/081,591

(22) Filed: Apr. 17, 2008

(65) Prior Publication Data

US 2009/0013988 A1  Jan. 15, 2009

(30) Foreign Application Priority Data

Jul. 9, 2007 (KR) .................. 20-2007-0011271 U
Jul. 11, 2007 (KR) .......................... 10-2007-069689

(51) Int. Cl.
*H05B 6/64* (2006.01)
*A21B 1/00* (2006.01)
*F24C 15/32* (2006.01)
*A47J 37/06* (2006.01)
*F24C 1/04* (2006.01)

(52) U.S. Cl.
CPC .............. *A47J 37/0623* (2013.01); *F24C 1/04* (2013.01); *H05B 6/6476* (2013.01); *A47J 37/0641* (2013.01)
USPC ........... 219/680; 219/681; 219/757; 219/400; 126/21 A (58) Field of Classification Search
USPC ........ 219/681, 757, 685, 400, 402, 678, 679, 219/680, 756, 683, 682; 126/21 A, 21 R, 4, 6
See application file for complete search history.

(56) References Cited

U.S. PATENT DOCUMENTS 5,674,425 A * 10/1997 Hong ............................ 219/681
5,756,974 A *  5/1998 Hong ............................ 219/681
6,060,701 A     5/2000 McKee et al.
(Continued)

FOREIGN PATENT DOCUMENTS

CN     1160155 A     9/1997
EP     0358344       8/1989
(Continued)

OTHER PUBLICATIONS

English Translation of Salentin et al. (EP 443330); Aug. 1991.*
(Continued)

*Primary Examiner* — Henry Yuen
*Assistant Examiner* — Hung D Nguyen
(74) *Attorney, Agent, or Firm* — Staas & Halsey LLP (57) ABSTRACT

A heating cooker including a cooker body having a cooking chamber and a convection heating unit. The convection heating unit includes a convection heater to generate heat, a convection fan to forcibly move the heat generated from the convection heater into the cooking chamber, a convection motor to drive the convection fan, and a convection housing to receive the convection heater and the convection fan. The convection heater and the convection fan are linearly arranged within the convection housing, to allow air introduced into the convection housing to move from the convection fan to the convection heater. This configuration is effective to restrict the transfer of heat from the convection heater to the convection motor.

16 Claims, 7 Drawing Sheets

(56) References Cited

U.S. PATENT DOCUMENTS

| | | | |
|---|---|---|---|
| 6,218,651 B1 | 4/2001 | Chung | |
| 2001/0032840 A1 | 10/2001 | Kim et al. | |
| 2002/0063126 A1 | 5/2002 | Kim et al. | |
| 2004/0134908 A1* | 7/2004 | Jeong | 219/757 |
| 2006/0157479 A1 | 7/2006 | Claesson et al. | |
| 2006/0186108 A1* | 8/2006 | Kim et al. | 219/400 |

FOREIGN PATENT DOCUMENTS

| | | |
|---|---|---|
| EP | 0443330 | 1/1991 |
| EP | 443330 A2 * | 8/1991 |
| JP | 58-033030 | 8/1981 |
| KR | 2002-0006805 | 1/2002 |
| KR | 10-0395929 | 8/2003 |
| KR | 10-2006-0116563 | 11/2006 |
| KR | 10-0686035 | 2/2007 |

OTHER PUBLICATIONS

Engish translation Abstract of Salentin et al. (EP 443330); Aug. 1991.*

Chinese Office Action issued Dec. 11, 2009 in corresponding Chinese Patent Application 200810092976.0.

European Search Report dated Apr. 2, 2009 issued in corresponding Patent Application.

Office Action issued by the Korean Patent Office on Jan. 16, 2012 in the related Korean patent application.

\* cited by examiner

CONVECTION HEATING UNIT AND HEATING COOKER HAVING THE SAME

CROSS-REFERENCE TO RELATED APPLICATIONS

This application claims the benefit of Korean Utility Model Application No. 2007-0011271, filed on Jul. 9, 2007 in the Korean Intellectual Property Office and Korean Patent Application No. 2007-0069689, filed on Jul. 11, 2007 in the Korean Intellectual Property Office, the disclosures of which are incorporated herein by reference.

BACKGROUND

1. Field

One or more embodiments of the present invention relate to a heating cooker, and, more particularly, to a convection heating cooker unit, which implements a convection heater to generate heat and a convection fan to blow the heat generated from the convection heater into a cooking chamber.

2. Description of the Related Art

In general, heating cookers used to cook food are basically classified, based on heating sources thereof, into a gas cooker using gas burning heat and an electric cooker using electric energy. The electric cookers may again be classified into electric heating types to cook food using heat generated from an electric heating element, induction heating types using eddy current, and high-frequency types to heat food by permeating microwaves, generated from a super-high-frequency oscillator, into food or contents of the cooker.

A heating cooker using electricity may employ any one of the following types: electric heating, induction heating, and high-frequency, or may mix two or three of the types, for example.

One example of a heating cooker using electricity is discussed in Korean Patent Registration No. 10-0686035 (registered on Feb. 15, 2007). Here, the discussed heating cooker is a microwave oven having a convection heating unit.

In this heating cooker, the convection heating unit is installed at a side of a cooking chamber, to heat and circulate air inside the cooking chamber. The convection heating unit includes a convection heater to generate heat, a convection fan to forcibly blow heated air, a convection motor to drive the convection fan, and a convection housing to receive the convection heater and the convection fan therein. The convection heater has a circular shape, and the convection fan is installed inside the circular convection heater.

Since the convection fan used to blow hot air into the cooking chamber is installed inside the circular convection heater, this conventional heating cooker has problems in that the heat generated from the convection heater is directly transmitted to the convection fan, and also easily transmitted further to the convection motor used to drive the convection fan. Therefore, the convection motor is easily heated, resulting in a high risk of heat damage to the motor.

To prevent such damage to the convection motor, a sufficient amount of heat-insulating material should be used to protect the convection motor, or a motor having a high heat-resistant level should be used. However, this results in an excessive increase in manufacturing costs.

Further, in the conventional heating cooker, the convection housing is configured to receive the convection fan and the convection heater disposed in the same plane, and a side surface of the housing, to which the convection fan is installed, has a flat plate shape. With this configuration, the convection motor driving the convection fan protrudes rearward from the convection fan, causing an increase in the overall width of the convection heating unit.

When a cooling fan is provided behind the convection motor to cool the convection motor to prevent such damage to the convection motor the width of the convection heating unit is still further increased.

SUMMARY

One or more embodiments of the present invention provide a convection heating unit and method restricting the transfer of heat from a convection heater to a convection motor. The convection heating unit may further be a heating cooker having such convection heating properties.

One or more embodiments of the present invention provide a convection heating unit with a slim configuration.

Additional aspects and/or advantages of the invention will be set forth in part in the description which follows and, in part, will be obvious from the description, or may be learned by practice of the invention.

To achieve the above and/or other aspects and advantages, embodiments of the present invention include a heating cooker including: a cooker body having a cooking chamber and a convection heating unit including a convection heater to generate heat, a convection fan to forcibly move the heat generated from the convection heater into the cooking chamber, a convection motor to drive the convection fan, and a convection housing to receive the convection heater and the convection fan, the convection motor being separate from the convection housing, and wherein the convection heater and the convection fan are linearly arranged to respectively communicate with the cooking chamber.

The heating cooker may further include a magnetron.

The convection housing may be coupled to a wall surface of the heating cooker body defining the cooking chamber, and the wall surface, to which the convection housing is coupled, has a plurality of holes to communicate the cooking chamber with an inner space of the convection housing.

The holes may be large enough to effect smooth circulation of air and small enough to prevent discharge, outside of the heating cooker, of high-frequency microwaves.

The plurality of holes may include suction holes arranged to correspond to the convection fan, so as to suction air inside the cooking chamber into the convection housing and discharge holes arranged to correspond to the convection heater, so as to discharge the air heated in the convection housing into the cooking chamber.

The convection fan may be provided below the convection heater.

The discharge holes may be provided only above the suction holes.

The convection housing may include a heater installation region to receive the convection heater and a fan installation region to receive the convection fan, and the heater installation region may have a deeper depth than a depth of the fan installation region.

The heater installation region may receive at least two convection heaters, and the convection heaters may be arranged parallel to each other.

An upper part of the fan installation region adjacent to the heater installation region may define an inclined region having a depth gradually increasing toward the heater installation region.

The inclined region may guide airstreams generated in the fan installation region to move towards the heater installation.

The fan installation region may have a semicircular shape such that a portion thereof except for the remaining portion adjacent to the heater installation region has a gently curved periphery.

The convection heater may have a linear shape.

To achieve the above and/or other aspects and advantages, embodiments of the present invention include a convection heating unit to supply hot air into a cooking chamber provided in a body of a heating cooker, including: a convection heater to generate heat, a convection fan to blow the heat generated from the convection heater into the cooking chamber, a convection motor to drive the convection fan, and a convection housing to receive the convection heater and the convection fan, the convection motor being separate from the convection housing, wherein the convection heater and the convection fan are linearly arranged to respectively communicate with the cooking chamber.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
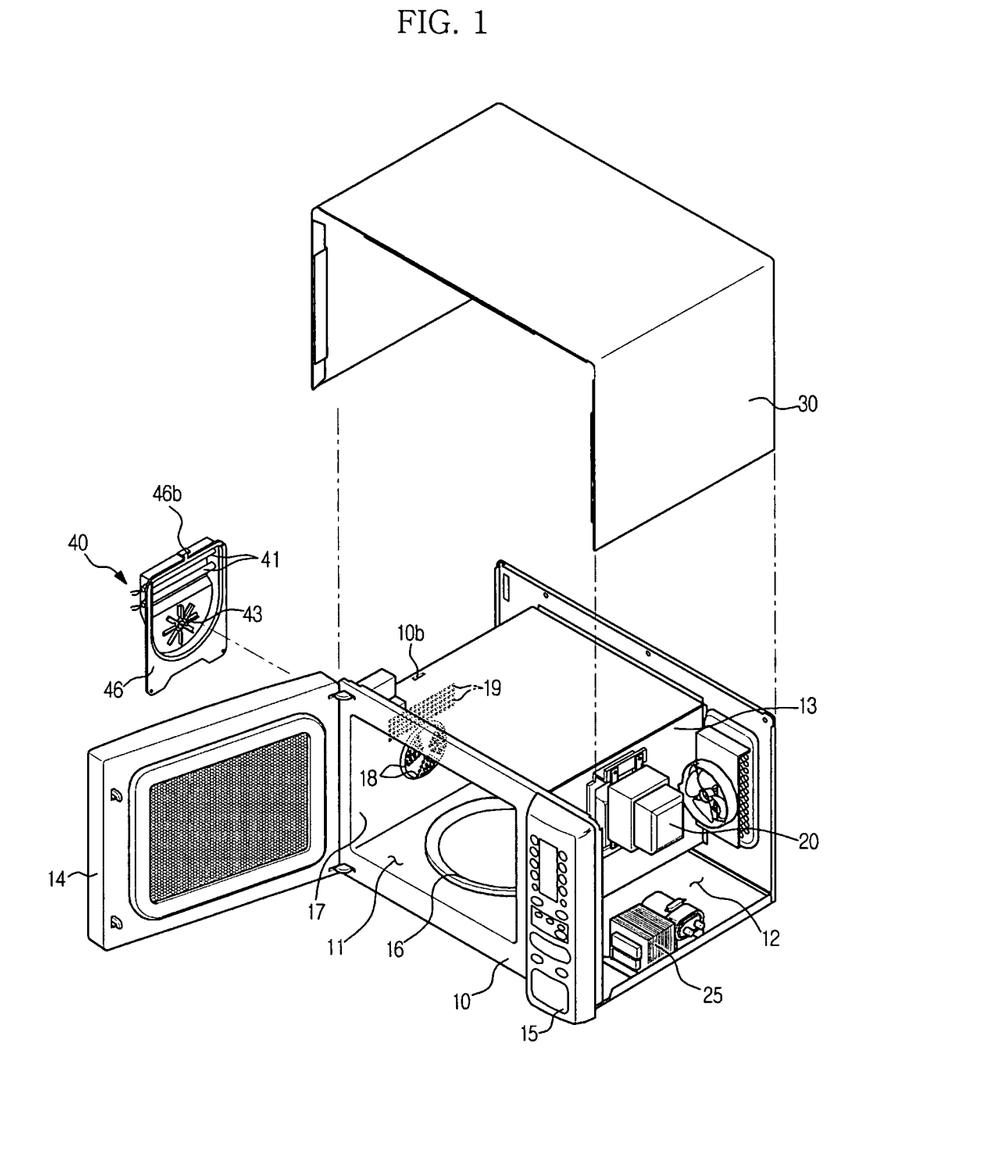
FIG. 1 illustrates a heating cooker, according to an embodiment of the present invention.

As shown in FIG. 1, a heating cooker may include a body 10 having a cooking chamber 11 therein, a door 14 to open or close an opened front side of the body 10, a magnetron 20 to apply high-frequency microwaves into the cooking chamber 11, and a convection heating unit 40 to supply hot air into the cooking chamber 11, for example.

An electric equipment room 12 may be provided along a side region of the body 10, to receive a variety of electric elements including the magnetron 20. The magnetron 20 may be coupled to an outer wall surface 13 of the cooking chamber 11. The door 14, to open or close the cooking chamber 11, and a control panel 15 for the manual operation of a user may further be installed at/along the front side of the body 10. A cover 30 can then be coupled to the upper side and both lateral sides of the body 10, to cover the electric equipment room 12 as well as both lateral sides and upper side of the body 10, for example. The cooking chamber 11 can also include a turntable 16 centrally disposed on the bottom thereof, to support food or containers thereon. If a cooking operation begins, the turntable 16 can be rotated by a motor (not shown). The electric equipment room 12 may include a high-pressure transistor 25.

Figure 2:
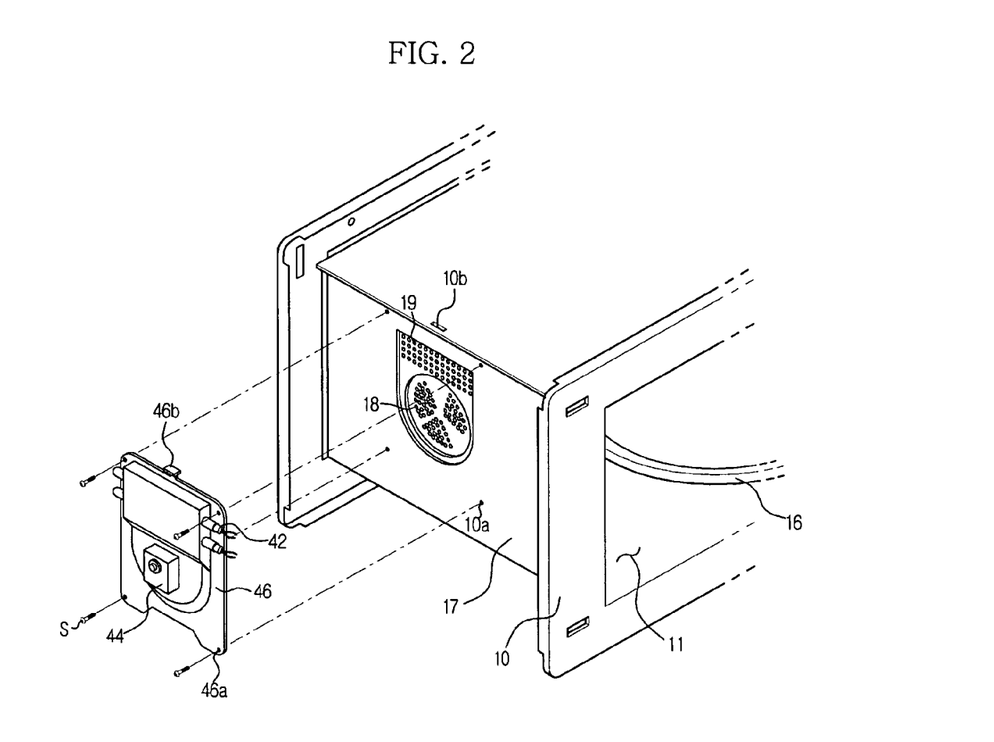
FIG. 2 illustrates a convection heating unit and an installation region thereof, such as in the heat cooker shown in FIG. 1, according to an embodiment of the present invention

As shown in FIGS. 1 and 2, in this embodiment the convection heating unit 40 is coupled to an outer wall surface 17 of the cooking chamber 11 opposite to the wall surface 13 installed with the magnetron 20. The convection heating unit 40 includes convection heaters 41 to generate heat, a convection fan 43 to blow air heated by the convection heaters 41 into the cooking chamber 11, a convection motor 44 to rotate the convection fan 43, and a convection housing 46 to receive the convection heaters 41 and the convection fan 43.

The convection housing 46 may be coupled to the body 10 by of screws, for example. For this, the convection housing 46 may have a plurality of coupling holes 46a for the coupling of screws (S, See FIG. 2) and the body 10 may have a plurality of screw holes 10a corresponding to the plurality of coupling holes 46a. In addition, the shown convection housing 46 has a hook 46b protruding upward from an upper end thereof, and the body 10 has a fixing recess 10b for the insertion of the hook 46b. During assembly, the hook 46b may be inserted into the fixing recess 10b, to temporarily couple the convection housing 46 to the body 10. Here, once the convection housing 46 is temporarily coupled to the body 10, the screws (S, See FIG. 2) can be easily fastened by the user to couple the convection housing 46 with the body 10.

In this embodiment, the coupling of the convection heating unit 40 may be accomplished by alternative methods such as calking, etc., in addition to the above described screw fastening method.

Again, as shown in FIG. 2, the wall surface 17, to which the convection housing 46 is coupled, has a plurality of suction holes 18 and a plurality of discharge holes 19. The convection housing 46 internally defines a convection chamber (47, See FIG. 3) in which the air from the cooking chamber 11 is suctioned and heated. All the plurality of suction holes 18 and discharge holes 19 may be arranged in a predetermined region, such that they are positioned within a range of the convection chamber 47 when the convection housing 46 is coupled to the wall surface 17. Here, the discharge holes 19 may be positioned above the suction holes 18. The suction holes 18 and the discharge holes 19 may be of a small size to prevent the high-frequency microwaves applied from the magnetron 20 from being discharged out of the cooking chamber 11. However, if the suction holes 18 and the discharge holes 19 have excessively small sizes, it prevents smooth circulation of air, and may result in deterioration in the heating efficiency of the convection heating unit 40. Therefore, in an embodiment, the suction holes 18 and the discharge holes 19 may preferably have a size as large as possible within a range of preventing the discharge of high-frequency microwaves.

Figure 3:
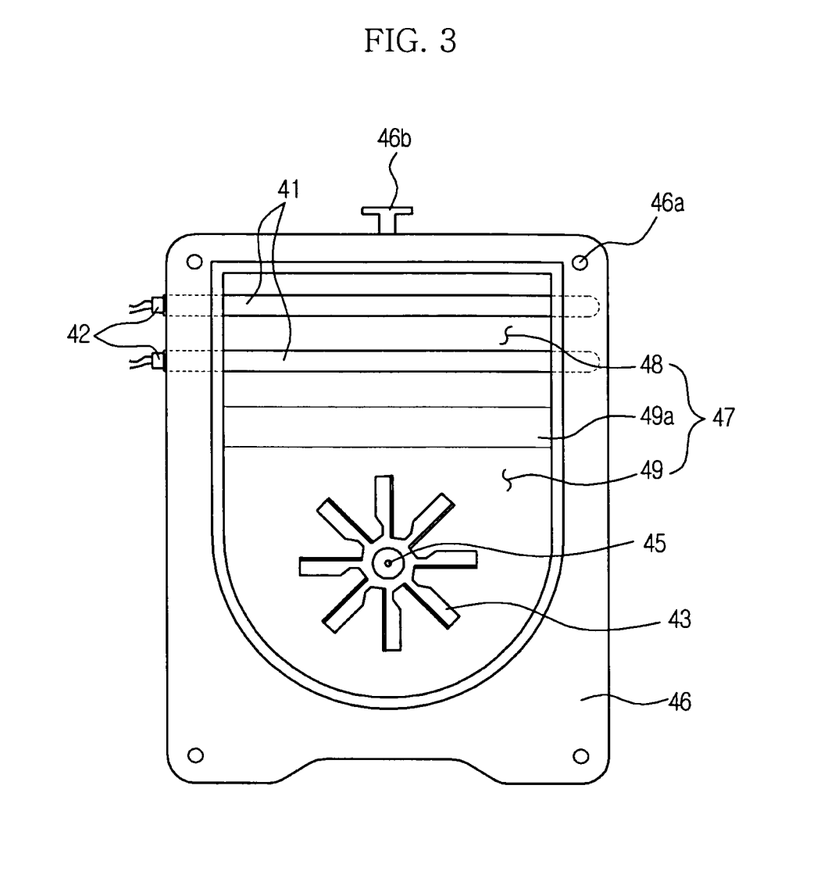
FIG. 3 illustrates a front view of a convection heating unit, such as of the heating cooker shown in FIG. 1, according to an embodiment of the present invention
Figure 4:
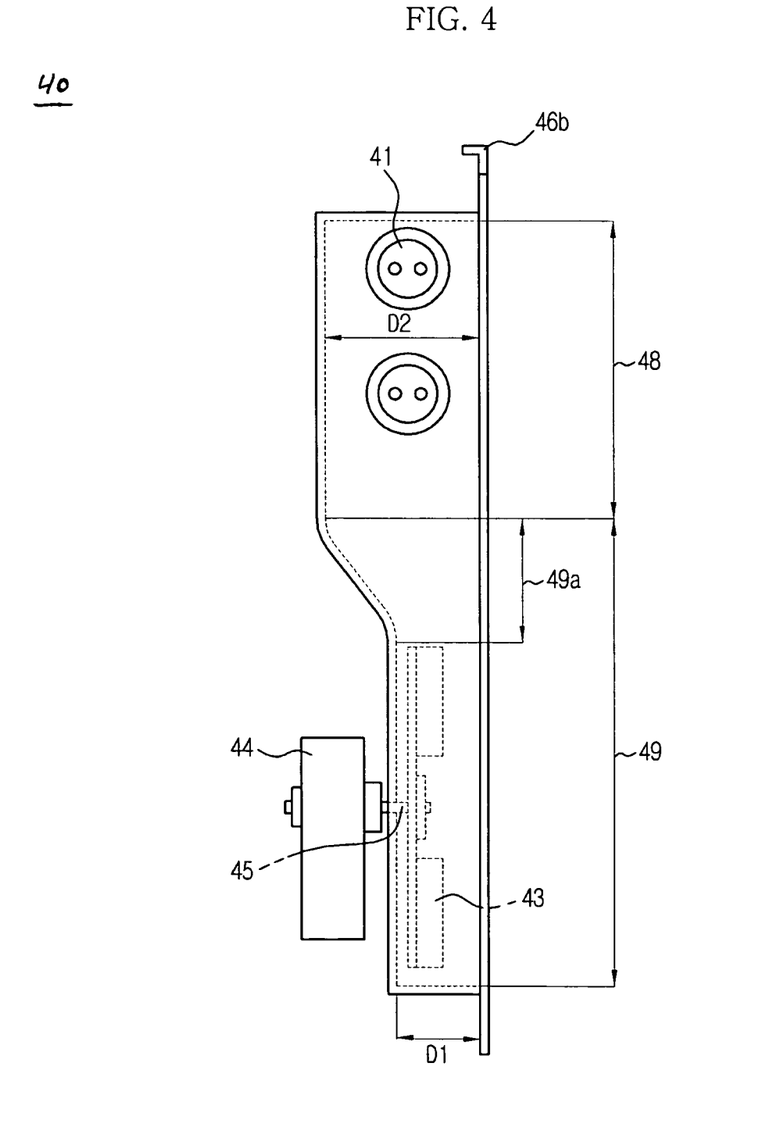
FIG. 4 illustrates a side view of a convection heating unit, such as shown in FIG. 3, according to an embodiment of the present invention

As shown in FIGS. 3 and 4, the convection chamber 47 in the convection housing 46 may be divided into a heater installation region 48, a fan installation region 49 and an inclined region 49a. As shown, the heater installation region 48 and the fan installation region 49 are arranged up and down in a line.

A pair of the linear convection heaters 41 may be arranged parallel to each other in two lines in the heater installation region 48. Here, both ends of each convection heater 41 are provided with terminals 42 for the supply of power. Both the ends of the convection heaters 41 penetrate through the housing 46 to extend outward such that the terminals 42 are located at/along the outside of the convection housing 46. Depending on embodiment, the number of the linear convection heaters 41 is not limited to the above described two.

The convection fan 43 may be installed in the fan installation region 49. Here, the convection fan 43 is coupled to a rotating shaft 45 of the convection motor 44. The rotating shaft 45 penetrates through the convection housing 46 to protrude into the fan installation region 49. In this embodiment, the convection motor 44 having the rotating shaft 45 is located at the outside of the convection housing 46. Here, the convection fan 43 rotates, air inside the cooking chamber (11, FIG. 1), is introduced into the fan installation region 49 through the plurality of suction holes (18, FIG. 2), and subsequently, moves into the heater installation region 48. The fan installation region 49 has a semicircular shape with a gently curved periphery except for the portion adjacent to the heater installation region 48. The shape of the fan installation region 49, allows the air introduced into the fan installation region 49 to be smoothly guided into the heater installation region 48, for example.

As shown in FIG. 4, the fan installation region 49 may have a shallower depth D1 than a depth D2 of the heater installation region 48. The heater installation region 48 may desirably require a predetermined volume of an inner space, in order to not only heat the suctioned air using the convection heater 41, but also to prevent radiation heat of the convection heater 41 from being transmitted directly to the convection housing (46, FIG. 3). On the other hand, since the fan installation region 49 may have no limit in the volume of an inner space thereof, as shown in FIG. 4, the depth D1 of the fan installation region 49 can be relatively reduced. With this configuration, the convection motor 44, installed behind the fan installation region 49, protrudes from the convection housing 46 by a reduced length. Accordingly, the overall depth of the convection heating unit 40 may be reduced, and the convection heating unit 40 may feature a slim configuration, compared to conventional arrangements.

In an embodiment of the present invention, the convection heaters 41 and the convection fan 43 are located at the center of the heater installation region 48 and at the center of the fan installation region 49, respectively. Because the convection heaters 41 and the convection fan 43 may not be located at/along the same plane, it may be possible to prevent air blown from the convection fan 43 from directly colliding with the convection heaters 41, and consequently, to prevent collision noise of air.

An upper part of the fan installation region 49 adjacent to the heater installation region 48 may define an inclined region 49a having a depth gradually increasing toward the heater installation region 48. The inclined portion 49a guides air streams generated in the fan installation region 49, to allow the air streams to smoothly move upward upon rotations of the convection fan 43.

Figure 5:
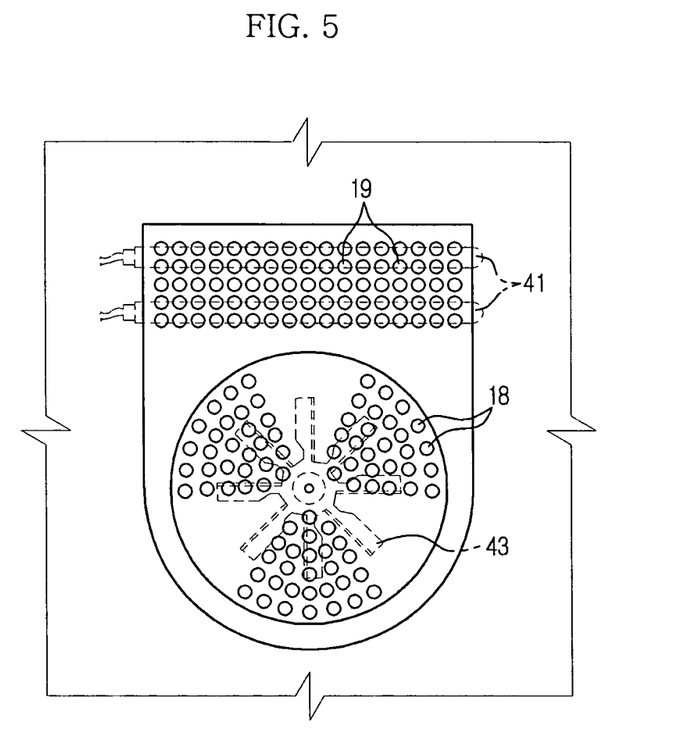
FIG. 5 illustrates a front view showing suction holes and discharge holes, such as shown in FIG. 2, according to an embodiment of the present invention.
Figure 6:
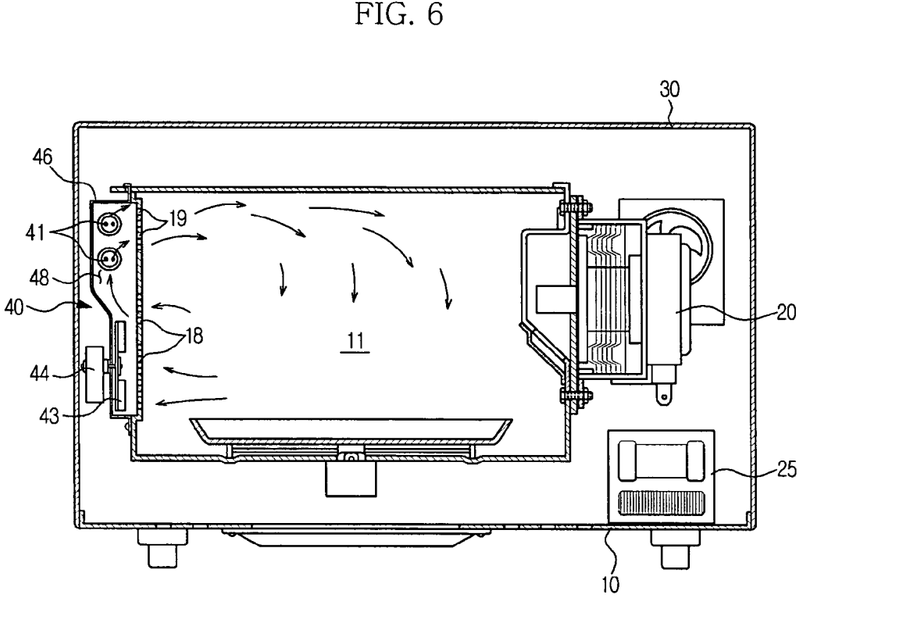
FIG. 6 illustrates a front view showing an air circulation path of the heating cooker, according to an embodiment of the present invention.

If the convection heating unit 40 is coupled to the body 10, as shown in FIGS. 5 and 6, the convection heaters 41 may be located to correspond to the discharge holes 19 of the wall surface (17, FIG. 1), and the convection fan 43 may be located to correspond to the suction holes 18.

Hereinafter, the operation of the heating cooker according to the embodiments of the present invention may be described with reference to FIGS. 1-6. The heating cooker according to embodiments of the present invention can cook food or other contents put into the cooking chamber 11 using high-frequency microwaves generated from the magnetron 20 and/or hot air generated from the convection heating unit 40.

In operation of the convection heating unit 40, the air inside the cooking chamber 11 is introduced into the convection chamber 47 of the convection heating unit 40 through the suction holes 18. After the air is heated by the convection heating unit 40, the heated air is again introduced into the cooking chamber 11 through the discharge holes 19, to heat food in the cooking chamber 11.

During the circulation of air between the cooking chamber 11 and the convection chamber 47, the air inside the cooking chamber 11 is first introduced into the fan installation region 49 and then, moves upward toward the heater installation region 48. Then, the air moved into the heater installation region 48 is heated by heat generated from the convection heaters 41. The heated air is discharged into the cooking chamber 11 through the discharge holes 19.

As described above, as the air introduced into the convection chamber 47 moves from the fan installation region 49 to the heater installation region 48 arranged in a line, the transfer of heat from the convection heaters 41 to the convection fan 43 is restricted. Moreover, the air heated in the heater installation region 48 moves upward, and thus, the transfer of heat to the convection motor 44 is further restricted. Accordingly, this substantially reduces the overheating of the convection motor 44.

Since the discharge holes 19, which discharge air from the convection chamber 47, are located in upper positions of the cooking chamber 11, the air heated by the convection heaters 41, as shown in FIG. 6, is dispersed downward from the upper side of the cooking chamber 11. Accordingly, the heated air is not concentrated to only a portion of food adjacent to the convection heating unit 40, but is dispersed throughout the food, except for the bottom of the food, so as to cook the overall food uniformly.

In one or more embodiments of the present invention, the convection heater 41 does not essentially have a linear shape, and may have other shapes such as a bent shape or folded shape.

Further, in one or more embodiments of the present invention, the convection heater 41 is not essentially provided above the convection fan 43 and the convection motor 44. The convection heaters 41 and the convection fan 43 may be arranged at left and right sides, so long as the convection heaters 41 are spaced apart from the convection fan 43 and the convection heaters 41 and the convection fan 43 are arranged in a line to allow the air streams to move from the convection fan 43 to the convection heaters 41.

Figure 7:
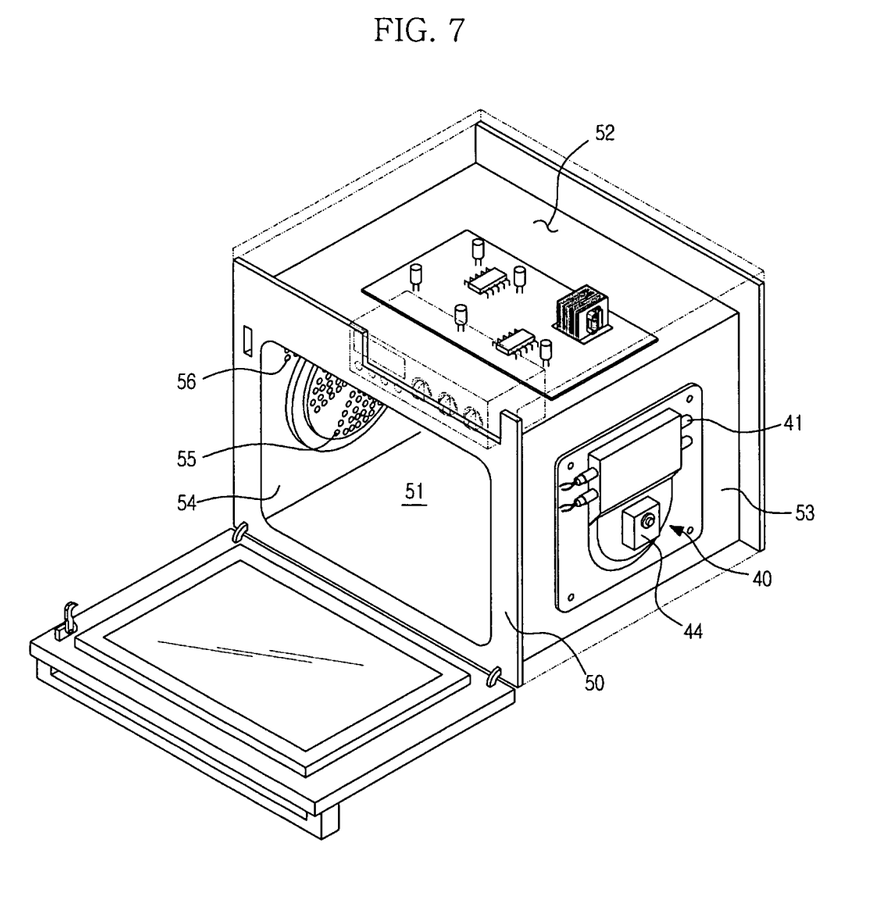
FIG. 7 illustrates a heating cooker, according to another embodiment of the present invention.

FIG. 7 illustrates a heating cooker, according to another embodiment of the present invention.

In this embodiment, the heating cooker, having body 50, an electric equipment room 52, to receive a variety of electric elements therein, is located along/at the top of a cooking chamber 51, and a pair of convection heating units 40 are installed along opposite outer wall surfaces 53 and 54 of the cooking chamber 51, respectively. Each wall surface 53 or 54, to which one of the convection heating units 40 is coupled, has suction holes 55 to suction air inside the cooking chamber 51 into the convection heating unit 40, and discharge holes 56 to discharge hot air from the convection heating unit 40 into the cooking chamber 51. The convection heating units 40 may be similar to the convection heating unit 40 of the heating cooker of the embodiment of FIG. 3, noting that differing embodiments are equally claimed.

As an example, the convection heaters 41 may be located above the convection fan 43, of FIG. 3 and the convection motor 44.

In the heating cooker of the present embodiment, the convection heating units 40, installed along opposite wall surfaces 53 and 54 of the cooking chamber 51, may have a slim configuration and feature an overall reduced width. Further, similar to the heating cooker of the embodiment of FIG. 6, heat transfer from the convection heaters 41 to the convection motor 44 can be restricted.

As a result of restricting heat transfer from the convection heaters 41 to the convection motor 44, it is possible to reduce the amount of heat-insulating materials used to protect the convection motor 44 compared to conventional styles, use of a motor having a low heat-resistant level is further possible. These result in a reduction in the manufacturing costs of the convection heating unit 40.

The slim convection heating unit 40 requires only a small installation space, and thus reduces the overall size of the heating cooker.

As apparent from the above description, one or more embodiments of the present invention may provide at least the following several effects.

Firstly, according to one or more embodiments of the present invention, a convection motor to drive a convection fan may be configured to not be easily heated by a convection heater. Accordingly, the amount of a heat-insulating material to protect the convection motor can be reduced, and the use of a motor having a low heat-resistant level is possible. This has the effect of reducing manufacturing costs of a convection heating unit.

Secondly, according to one or more embodiments of the present invention, a fan installation region included in a convection housing to install the convection fan therein may have a shallower depth than that of a heater installation region of the convection housing to install the convection heater. With this configuration, the convection motor, installed behind the convection fan, may protrude from the convection housing only by a horizontal length smaller than conventional configurations, and consequently, the overall convection heating unit can achieve a slim configuration.

While aspects of the present invention have been particularly shown and described with reference to differing embodiments thereof, it should be understood that these exemplary embodiments should be considered in a descriptive sense only and not for purposes of limitation. Any narrowing of functionality or capability of an aspect in one embodiment should not be considered as a respective narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in this embodiment without departing from the principles and spirit of the invention, the scope of which is defined in the claims and their equivalents.

What is claimed is:

1. A heating cooker comprising:
   a magnetron;
   a cooking chamber; and
   a convection heating unit including a convection heater to generate heat, a convection fan to forcibly move the heat generated from the convection heater into the cooking chamber, a convection motor to drive directly the convection fan, and a convection housing to receive the convection heater and the convection fan, the convection motor being separate from the convection housing and located outside of the convection housing,
   wherein the convection housing is coupled to an outer side wall surface of the cooking chamber opposite to a wall surface installed with the magnetron,
   wherein the convection heater is positioned above the convection fan, the convection housing includes a heater installation region to receive the convection heater, a fan installation region to receive the convection fan, and an inclined region having a depth gradually increasing toward the heater installation region and disposed between the fan installation region and the heater installation region,
   wherein the heater installation region has a deeper depth than a depth of the fan installation region, and the convection motor is installed behind the fan installation region so that an overall depth of the convection heating unit is reduced and the convection heating unit having a slim configuration can be accomplished, and
   wherein the convection heater and the convection fan are each located in different planes parallel to the outer wall surface of the cooking chamber.

2. The heating cooker according to claim 1, wherein the convection heater has a linear shape.

3. The heating cooker according to claim 1, wherein a side surface of the cooking chamber, to which the convection housing is coupled, has vent holes to correspond, respectively, to the convection heater and the convection fan.

4. The heating cooker according to claim 3, wherein the vent holes are large enough to effect smooth circulation of air, and small enough to prevent discharge outside of the cooking chamber of high-frequency microwaves.

5. The heating cooker according to claim 3, wherein the vent holes include:
   suction holes arranged to correspond to the convection fan, to suction air of the cooking chamber into the convection housing; and
   discharge holes arranged to correspond to the convection heater, to discharge the air, heated in the convection housing, into the cooking chamber.

6. The heating cooker according to claim 5, wherein the discharge holes are provided only above the suction holes.

7. The heating cooker according to claim 1, wherein the heater installation region receives at least two convection heaters, the convection heaters arranged parallel to each other.

8. The heating cooker according to claim 1, wherein an upper part of the fan installation region adjacent to the heater installation region defines the inclined region.

9. The heating cooker according to claim 1, wherein the fan installation region has a semicircular shape such that a portion thereof except for the remaining portion adjacent to the heater installation region has a gently curved periphery.

10. The heating cooker according to claim 1, wherein the convection housing has a hook for coupling with the outer wall surface of the cooking chamber.

11. A convection heating unit to supply hot air into a cooking chamber provided in a body of a heating cooker, comprising:
   a convection heater to generate heat, a convection fan to blow the heat generated from the convection heater into the cooking chamber, a convection motor to drive directly the convection fan, and a convection housing to receive the convection heater and the convection fan, the convection motor being separate from the convection housing and located outside of the convection housing, wherein the convection housing is coupled to an outer side wall surface of the cooking chamber opposite to a wall surface installed with a magnetron, wherein the convection heater is positioned above the convection fan, the convection housing includes a heater installation region to receive the convection heater, a fan installation region to receive the convection fan, and an inclined region having a depth gradually increasing toward the heater installation region and disposed between the fan installation region and the heater installation region, wherein the heater installation region has a deeper depth than a depth of the fan installation region, and the convection motor is installed behind the fan installation region so that an overall depth of the convection heating unit is reduced and the convection heating unit having a slim configuration can be accomplished, and wherein the convection heater and the convection fan are each located in different planes parallel to the outer wall surface of the cooking chamber.

12. The convection heating unit according to claim 11, wherein an upper part of the fan installation region adjacent to the heater installation region defines the inclined region.

13. The convection heating unit according to claim 11, wherein the fan installation region has a semicircular shape such that a portion thereof except for the remaining portion adjacent to the heater installation region has a gently curved periphery.

14. The convection heating unit according to claim 11, wherein the heater installation region receives at least two convection heaters, the convection heaters arranged parallel to each other.

15. The convection heating unit according to claim 11, wherein the convection heater has a linear shape.

16. The convection heating unit according to claim 11, wherein vent holes located between the convection housing and the cooking chamber are large enough to effect smooth circulation of air, and small enough to prevent discharge outside of the cooking chamber of high-frequency microwaves.

* * * * *

UNITED STATES PATENT AND TRADEMARK OFFICE
CERTIFICATE OF CORRECTION

| | | |
|---|---|---|
| PATENT NO. | : 8,847,129 B2 | Page 1 of 1 |
| APPLICATION NO. | : 12/081591 | |
| DATED | : September 30, 2014 | |
| INVENTOR(S) | : Kwang Keun Kim et al. | |

It is certified that error appears in the above-identified patent and that said Letters Patent is hereby corrected as shown below:

On the Title Page, Page 2, Column 2, Item [56] (Other Publications), Line 1, Delete "Engish" and insert -- English --, therefor.

Signed and Sealed this
Sixth Day of January, 2015

Michelle K. Lee
*Deputy Director of the United States Patent and Trademark Office*